(12) United States Patent
Iwamatsu et al.

(10) Patent No.: US 9,363,405 B2
(45) Date of Patent: Jun. 7, 2016

(54) LIGHT IRRADIATION SYSTEM, IMAGE SCANNING APPARATUS, AND IMAGE FORMING APPARATUS

(71) Applicants: Akihiro Iwamatsu, Kanagawa (JP); Tsuyoshi Fujimoto, Kanagawa (JP)

(72) Inventors: Akihiro Iwamatsu, Kanagawa (JP); Tsuyoshi Fujimoto, Kanagawa (JP)

(73) Assignee: RICOH COMPANY, Tokyo (JP)

( * ) Notice: Subject to any disclaimer, the term of this patent is extended or adjusted under 35 U.S.C. 154(b) by 0 days.

(21) Appl. No.: 14/193,216

(22) Filed: Feb. 28, 2014

(65) Prior Publication Data

US 2014/0268254 A1    Sep. 18, 2014

(30) Foreign Application Priority Data

Mar. 13, 2013  (JP) .................................. 2013-049875

(51) Int. Cl.
*H04N 1/028*    (2006.01)

(52) U.S. Cl.
CPC ......... *H04N 1/02825* (2013.01); *H04N 1/0284* (2013.01)

(58) Field of Classification Search
None
See application file for complete search history.

(56) References Cited

U.S. PATENT DOCUMENTS 7,085,023 B2 *  8/2006  Okamoto et al. ............. 358/471
2005/0088707 A1  4/2005  Sakurai et al.

FOREIGN PATENT DOCUMENTS

| JP | 2005-102112 | 4/2005 |
| JP | 2007-005860 | 1/2007 |
| JP | 2010-219600 | 9/2010 |
| JP | 2011-071608 | 4/2011 |
| JP | 2011-082767 | 4/2011 |

OTHER PUBLICATIONS

U.S. Appl. No. 14/164,439, filed Jan. 27, 2014.

* cited by examiner

*Primary Examiner* — Paul F Payer
(74) *Attorney, Agent, or Firm* — Harness, Dickey & Pierce, P.L.C.

(57) ABSTRACT

A light irradiation system for irradiating light to an irradiation area extending in a main scanning direction of a document face when placed on an image scanning apparatus includes a light source; a light guiding member to guide light emitted from the light source; and a reflector to reflect a part of light exiting from the light guiding member to the document face. The irradiation area is irradiated by the reflection light reflected by the reflector and a direct light exiting from the light guiding member without reflection at the reflector. The light guiding member includes an incidence surface where the light from the light source enters; and an exit surface where the light entered from the incidence surface exits. The reflector is disposed at a position in a direction that light intensity of light emitting from the light source becomes the strongest.

10 Claims, 8 Drawing Sheets

COMPARISON EXAMPLE

COMPARISON EXAMPLE

LIGHT IRRADIATION SYSTEM, IMAGE SCANNING APPARATUS, AND IMAGE FORMING APPARATUS

CROSS-REFERENCE TO RELATED APPLICATION

This application claims priority pursuant to 35 U.S.C. §119 to Japanese Patent Application No. 2013-049875, filed on Mar. 13, 2013 in the Japan Patent Office, the disclosures of which is incorporated by reference herein in their entirety.

BACKGROUND

1. Technical Field

The present invention relates to a light irradiation system of an image scanning apparatus employed for copiers, facsimile machines, image scanners, an image scanning apparatus having the light irradiation system, and an image forming apparatus having the image scanning apparatus.

2. Background Art

Image scanning apparatuses employed for copiers, facsimile machines, and image scanners include a light source that emits a light to a scan target such as a document face placed on a contact glass. The image scanning apparatuses further includes an image scanning unit having a image focus lens for focusing an image of scanning light reflected from the document face and progressing along a scan light axis, and an image capturing element such as a charge coupled device (CCD) that focuses the image of the image of scanning light to scan a document image.

The image scanning apparatuses typically employ a rod-shaped light source such as a fluorescent light and a xenon lamp or a point light source such as a light emitting diode (LED) as the light source. In view of demands to high speed activation, longer life time, energy saving to the light source, the LED has been replacing the fluorescent light and xenon lamp as the light source.

FIG. 1 is a schematic side view of a light irradiation system of conventional image scanning apparatuses. As shown in FIG. 1, the light irradiation system includes a first moving unit 103, a bracket 121, a circuit board 123, and a light emitting diode (LED) 122. The bracket 121 having a cross-sectional shape of V is attached to the first moving unit 103, the circuit board 123 is attached to the bracket 121, and the LED 122 is attached to the circuit board 123.

Further, the first moving unit 103 is attached with a reflector 118, which is a reflection plate that reflects light coming from the LED 122, to correct irradiation profile and to eliminate shadow which may occur when scanning a so-called cut-and-paste document.

In conventional image scanning apparatuses employing the light irradiation system shown in FIG. 1, a distance (i.e., light path) from a document face 102 to an image capturing element is relatively long. Therefore, in conventional image scanning apparatuses, attenuation of scanning light between the document face 102 and the image capturing element becomes greater, and therefore, light intensity of the LED 122 is required to be set greater.

As for the LED 122, one single LED has a small light flux amount and a narrower irradiation area. Therefore, in conventional image scanning apparatuses, a plurality of LEDs 122 are arranged in an array pattern in a main scanning direction of document to increase light intensity on the document face 102.

When the plurality of LEDs 122 are arranged in the array pattern, the LEDs 122 are arranged by slanting the LEDs 122 with respect to the document face 102 using the bracket 121 to obtain a preferable irradiation profile in a sub-scanning direction of the document face 102. The irradiation profile in the sub-scanning direction on the document face 102 is preferably set only at an actual scan area on document such as an irradiation area E on the document face 102 shown in FIG. 1.

However, even if the LED 122 is disposed at the slanted position, and an irradiation light from the LED 122 is reflected at the reflector 118 and then directed to the document face 102, some light is irradiated to an area other than the irradiation area E, which can be confirmed by observing the irradiation profile in the sub-scanning direction on the document face 102.

In this case, for example, when a small black solid image surrounded by a white area is scanned, light reflected from the white area existing in the irradiation area E enters an image capturing element. Therefore, an output value corresponding to the black solid image may be increased, with which the black solid image cannot be reproduced correctly.

SUMMARY

In one aspect of the present invention, the light irradiation system is devised. The light irradiation system for irradiating light to an irradiation area extending in a main scanning direction of a document face when placed on an image scanning apparatus includes a light source; a light guiding member to guide light emitted from the light source; and a reflector to reflect a part of light exiting from the light guiding member to the document face as first light. The irradiation area is irradiated by the first light reflected from the reflector and second light exiting from the light guiding member to the document face directly without reflection at the reflector. The light guiding member includes an incidence surface where the light from the light source enters; and an exit surface where the light entered from the incidence surface exits to either the document face directly or the reflector. The reflector is disposed at a position in a direction that light intensity of light emitting from the light source becomes the strongest.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
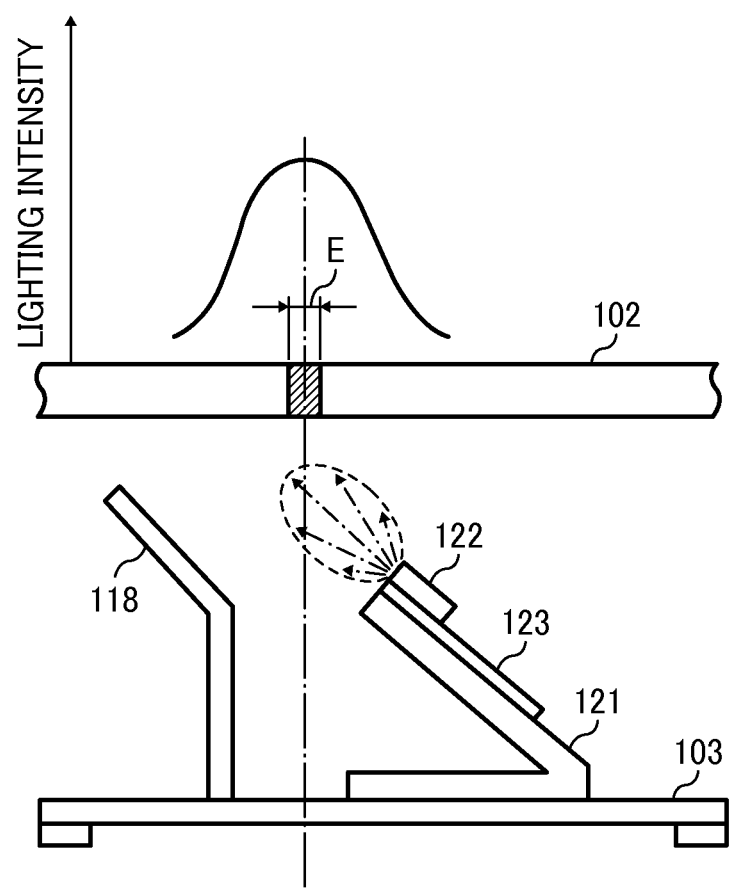
FIG. 1 is a schematic side view of a light irradiation system for conventional image scanning apparatuses.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, an apparatus or system for a light irradiation system, an image scanning apparatus and an image forming apparatus according to an example embodiment are described hereinafter.

First Example Embodiment of Light Irradiation System

A description is given of a light irradiation system according to a first example embodiment.

Figure 2:
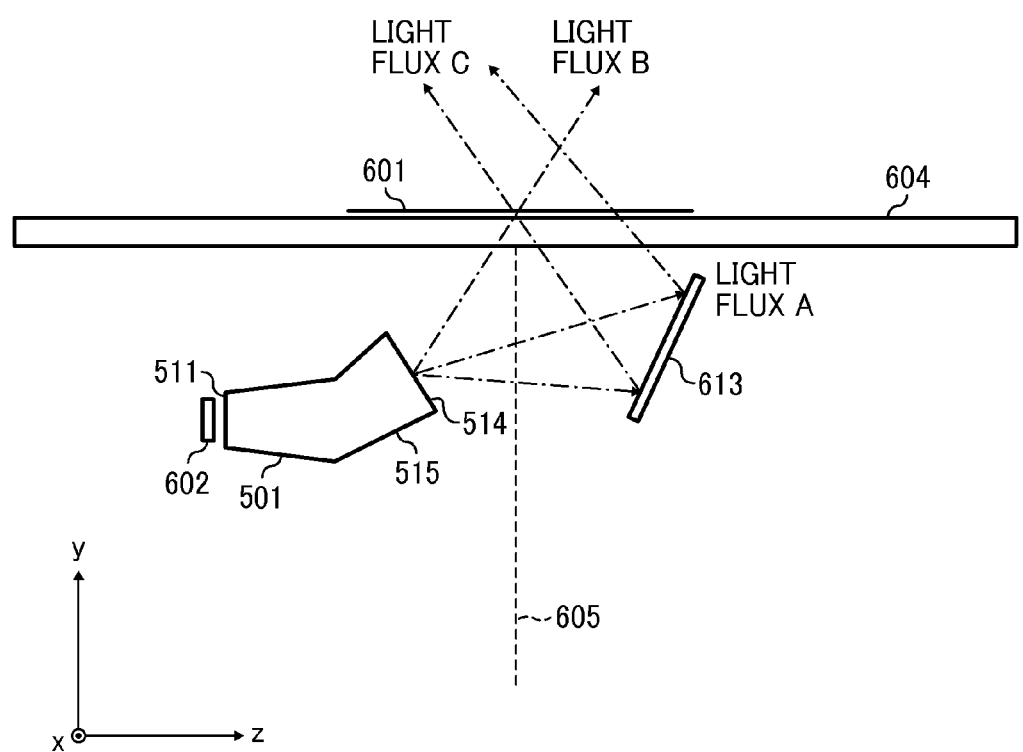
FIG. 2 is a schematic side view of a light irradiation system according to an example embodiment.

FIG. 2 is a schematic side view of a light irradiation system according to an example embodiment. The light irradiation system can be disposed on a first carriage. As shown in FIG. 2, the light irradiation system includes, for example, a light source 602, a light guide member 501, and a counter reflector 613 which is a reflector according to the first example embodiment.

The light irradiation system irradiates light to a document face 601 placed on a contact glass 604 made of a translucent material such as glass. Specifically, an irradiation area of the document face 601 is irradiated with light by the light irradiation system.

The irradiation area of the document face 601 is a line area extending in the main scanning direction, and an optical axis of an optical scan system 605 is aligned to the line area, which means the irradiation area of the document face 601 has a given width in the sub-scanning direction (Z-direction) and is aligned to the optical axis 605 of the optical scan system. In this configuration, the light irradiation system irradiates the irradiation area using light coming from two directions, in which one light (hereinafter, direct light) comes directly from the light guide member 501 to the document face 601 and another light (hereinafter, indirect light) comes to the document face 601 as a reflection light reflecting from the counter reflector 613.

The optical scan system, disposed at a given position on the optical axis 605, receives a part of light reflected and diffused on the document face 601. The center position of the irradiation area (hereinafter, irradiation position) and a point where the optical axis 605 intersects on the document face 601 are matched or substantially matched.

The up and down direction in FIG. 2 is referred to as the Y-axis direction, the left and right directions in FIG. 2 is referred to as the Z-axis direction, and a direction perpendicular to the Y-axis direction and the Z-axis direction is referred to as the X-axis direction. In FIG. 2, the Z-axis direction corresponds to the sub-scanning direction, wherein light having the strongest intensity is emitted along the sub-scanning direction in an irradiation angle range of the light source 602. Further, the X-axis direction is the main scanning direction perpendicular to the sub-scanning direction.

Further, a coordinate in the Y-axis direction of a position where the direct light directly irradiates the document face 601 from the light guide member 501 and the indirect light that irradiates the document face 601 via the counter reflector 613 intersect is set higher than a surface of the contact glass 604 in +Y-axis direction (upper direction in FIG. 2) for a little. This configuration is applied to irradiate light on the document face 601 effectively even if document comes off from the surface of the contact glass 604.

The light source 602 can employ, for example, point light sources such as LED and laser diode (LD), and rod-shaped light sources such as a fluorescent light and a cold cathode fluorescent lamp (CCFL).

The light source 602 of the first example embodiment may use an artificial white LED, in which blue light emitted from a blue light emitting element excites yellow fluorescent substance, and the blue light and yellow light emitted from the yellow fluorescent substance are synthesized to artificially generate white light.

In the first example embodiment, the light source 602 uses, for example, a plurality of light emitting elements. Specifically, the light source 602 has a light emitting face having arranged a plurality of light emitting elements such as LEDs in the main scanning direction. The direction that the light intensity of light emitting from the light source 602 becomes the strongest is different from a direction extending from the light source 602 to the irradiation area.

The light guide member 501 includes, for example, an incidence surface 511, an exit surface 514, and a light guiding part. Light emitted from the source 602 enters the incidence surface 511. The light entered from the incidence surface 511 exits from the exit surface 514. The light guiding part guides a part of the light entering from the incidence surface 511 to the exit surface 514. For example, the light guide member 501 includes the exit surface 514 as only one exit surface. Compared to a light guide member having a plurality of exit surfaces, the light guide member 501 can be manufactured easily.

As shown in FIG. 2, the counter reflector 613 is disposed at the opposite side of the light guide member 501 with respect to the optical axis 605 of the optical scan system, and the counter reflector 613 is disposed on the direction that the light intensity of light emitting from the light source 602 becomes the strongest. By irradiating the light to the document face 601 from two directions (i.e., one direction from the light guide member 501 and another direction from the counter reflector 613) with respect to the optical axis 605 of the optical scan system, the light irradiation system according to the first example embodiment can prevent an occurrence of shadow on a cut-and-paste document.

The counter reflector 613 is disposed at the opposite side of the light guide member 501 with respect to the optical axis 605 of the optical scan system, and also disposed on the direction that the light intensity of light emitted from the light source 602 becomes the strongest. Therefore, the exit surface 514 cannot be viewed from a back side of the counter reflector 613 (from the right side direction in FIG. 2).

The counter reflector 613 is, for example, configured with metal such an aluminum plate, an aluminum-deposited face, or an aluminum sheet. Further, the spectral reflectance of the counter reflector 613 is smaller than one (1) such as from 0.8 to 0.9.

Figure 3:
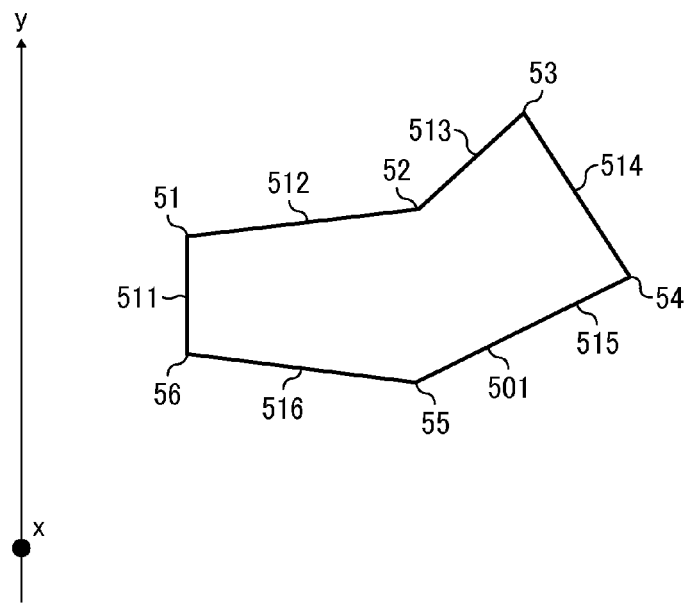
FIG. 3 is a schematic side view of a light guide member of the light irradiation system of FIG. 2.

FIG. 3 is a schematic side view of the light guide member 501 of the light irradiation system according to the first example embodiment. The light guide member 501 is a long light guide member, and the long side direction (X-axis direction) corresponds to the main scanning direction.

The light guiding part includes, for example, side faces 512, 513 and 516 and a total reflection face 515 to propagate the light entering from the incidence surface 511 inside the light guide member 501. The total reflection face 515 totally reflects a part of the light entered from the incidence surface 511 toward the irradiation area.

The light guide member 501 includes six tops 51, 52, 53, 54, 55 and 56 on the YZ plane. The tops 51 and 56 are included in the incidence surface 511. The tops 53 and 54 are included in the exit surface 514. The tops 54 and 55 are included in the total reflection face 515. The tops 51 and 52 are included in the side face 512. The tops 52 and 53 are included in the side face 513. The tops 55 and 56 are included in the side face 516.

Among the six tops 51, 52, 53, 54, 55 and 56 of the light guide member 501, the light guide member 501 has a bending structure which bends toward the document face 601 side at the top 52 and the top 55, in which the total reflection face 515 slants from the top 55 to the top 54 in a direction toward the document face 601.

Further, a position of the Y-axis direction of the top 54 connecting the total reflection face 515 and the exit surface 514 (Y-axis direction in FIG. 3) is between the top 51 and the top 56 included in the incidence surface 511 when viewed along the Y-axis direction. The coordinate in the Y-axis direction will be described later.

The side faces 512, 513 and 516 and the total reflection face 515 are mirror finished faces. Therefore, as to the light guide member 501, light entered from the incidence surface 511 is totally reflected by the side faces 512, 513 and 516, and the total reflection face 515 while propagating inside the light guide member 501. Therefore, the light guide member 501 can guide the incident light entered in the light guide member 501 to the exit surface 514 efficiently without causing a reflection loss of light.

Further, the incidence surface 511 or the exit surface 514 can be disposed with a transparent diffusion structure, having formed with surface texturing or dot pattern, to achieve a standard that the light irradiation system needs to satisfy such as safety standard, and/or set a desirable light irradiation angle property for the light irradiation system.

A transmission efficiency of a face having the diffusion structure becomes lower than a transmission efficiency of other side faces of the light guide member 501 finished as mirror finished face. Therefore, if the light irradiation system is required to have higher light use efficiency, it is not preferable to set the diffusion structure at both of the incidence surface 511 and the exit surface 514. This transmission property also occurs when a diffusion structure of reflection type is disposed on the reflection face.

Therefore, as to the light irradiation system according to the first example embodiment, the diffusion structure is preferably disposed on a face that passes or reflects light to be reached to a desired irradiation position on the document face. As to the light guide member 501, the diffusion structure is preferably disposed at any one of incidence surface 511 and the exit surface 514.

In the first example embodiment, the diffusion structure is disposed, for example, on the exit surface 514.

The light emitted from the light source 602 enters into the light guide member 501 through the incidence surface 511. The light entered the light guide member 501 exits from the exit surface 514, and is then irradiated to the document face 601, in which the light guide member 501 can be used to divide a light path into two light paths.

The two light paths may be referred to as a first light path and a second light path for the simplicity of the expression. The first light path, which is one of the two paths divided by the light guide member 501, is a path for the light reflected by the total reflection face 515, slanted toward the document face, and is then directly irradiated to the document face 601 by passing through the exit surface 514.

The second light path, which is another path of the two paths divided by the light guide member 501, is not reflected by the total reflection face 515 after entering the light guide member 501, but is irradiated to the counter reflector 613 by passing through the exit surface 514.

As above described, light exits from the exit surface 514, which is a single exit surface, in two light paths, wherein in the first light path, light exits from the exit surface 514 to the irradiation area after totally reflected at the total reflection face 515, and in the second light path, light exits from the exit surface 514 to the counter reflector 613 without totally reflection at the total reflection face 515.

As shown in FIG. 2, as to the light irradiation system of the first example embodiment, light exits mainly in three directions such as light flux A, light flux B and light flux C. In FIG. 2, zero (0) degree corresponds to +Z-axis direction of FIG. 2, and +90 degrees degree corresponds to +Y-axis direction of FIG. 2.

The light flux A enters the light guide member 501 and then exits from the exit surface 514 toward the counter reflector 613 without reflection at the total reflection face 515, in which the light flux A exits in a direction with about +20 degrees from +Z-axis to +Y-axis as shown in FIG. 2.

The light flux A is a light flux having the strongest light intensity of light emitting from the light source 602, and the light flux A is reflected by the counter reflector 613 disposed at the opposite side of the light guide member 501 with respect to the optical axis 605 of the optical scan system. Therefore, the light flux A exits from the counter reflector 613 in a direction with about +120 degrees from +Z-axis to +Y-axis as shown in FIG. 2.

Further, the light flux B is reflected at the total reflection face 515, and exits from the exit surface 514 toward the document face 601 with about +50 degrees as shown in FIG. 2.

Further, the light flux C enters the light guide member 501 and exits from the exit surface 514 without reflection at the total reflection face 515 toward the counter reflector 613, and is then reflected at the counter reflector 613 with about +120 degrees as shown in FIG. 2.

Figure 4:
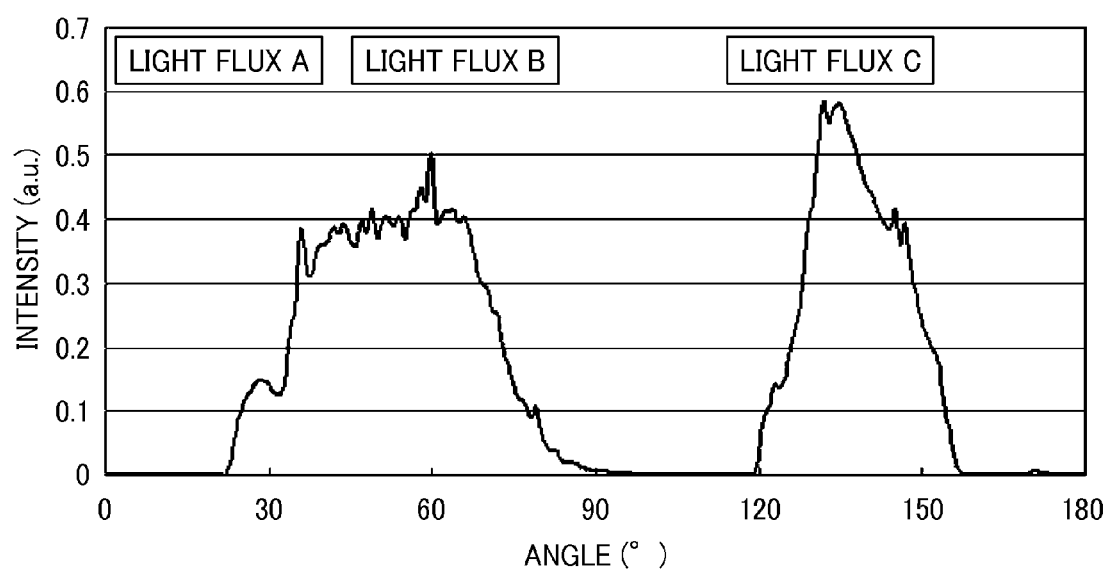
FIG. 4 is an example of light intensity profile of irradiation light emitted from the light irradiation system of FIG. 2 with respect to exit angles.

FIG. 4 is an example of light intensity profile of irradiation light emitted from the light irradiation system of the first example embodiment (FIG. 2) with respect to exit angles. As shown in FIG. 4, as to the light irradiation system of the first example embodiment, light is not irradiated to the direction of about +20 degrees from +Z-axis to +Y-axis, which is the exit angle of the light flux A.

Figure 5:
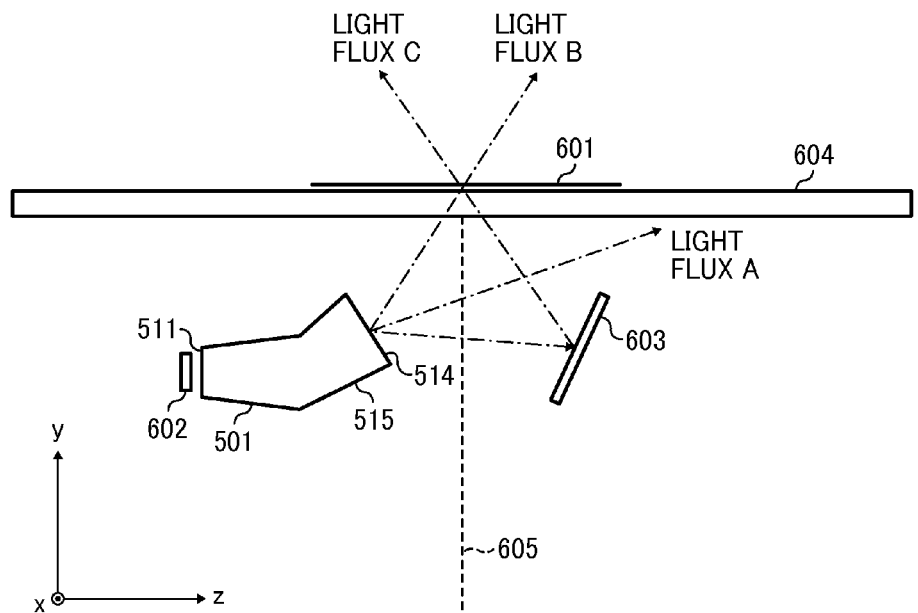
FIG. 5 is a schematic side view of a light irradiation system, which is a comparison example with respect to the light irradiation system of FIG. 2.

FIG. 5 is a schematic side view of a light irradiation system, which is a comparison example of the light irradiation system according to the first example embodiment shown in FIG. 2. As shown in FIG. 5, a position of a counter reflector 603 in the light irradiation system of the comparison example is different from a position of the counter reflector 613 in the light irradiation system according to the first example embodiment shown in FIG. 2.

Specifically, in the light irradiation system of the comparison example, the counter reflector 603 is disposed at the opposite side of the light guide member 501 with respect to the optical axis 605 of the optical scan system, and is disposed at the lower direction (+Y-axis direction) compared to the direction that the light intensity of light emitting from the light source 602 becomes the strongest.

Therefore, in the light irradiation system of the comparison example, the light flux A, entering the light guide member 501 and exiting from the exit surface 514 without reflection at the total reflection face 515 toward the counter reflector 603 with an angle of about +20 degrees, passes through the contact glass 604.

Figure 6:
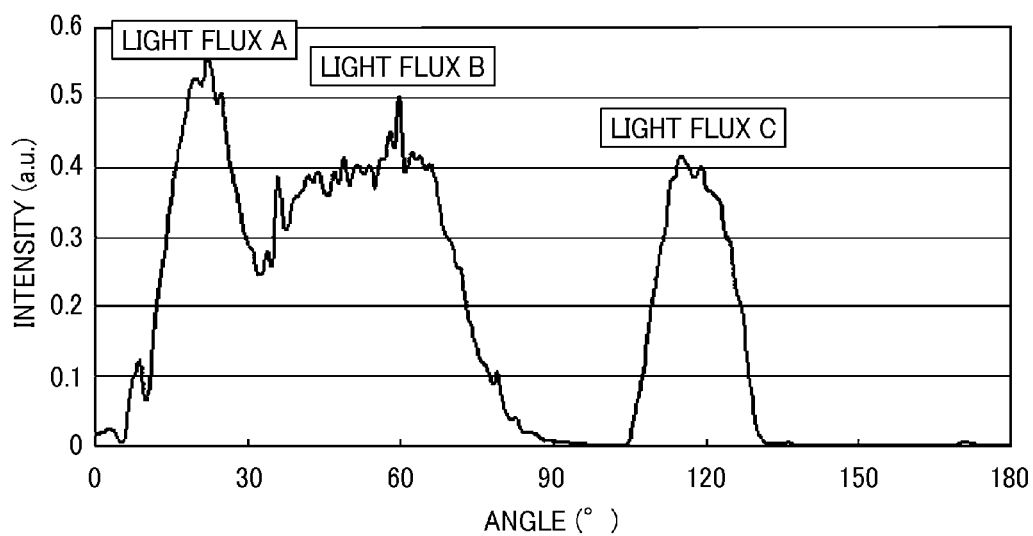
FIG. 6 is an example of light intensity profile of irradiation light emitted from the light irradiation system of comparison example of FIG. 5 with respect to exit angles.

FIG. 6 is an example of light intensity profile of irradiation light emitted from the light irradiation system of comparison example of FIG. 5 with respect to exit angles. As shown in FIG. 6, in the light irradiation system of the comparison example, because the light flux A is not reflected by the counter reflector 603, the light intensity is detected in the direction of about +20 degrees from +Z-axis to +Y-axis, which is the exit angle of the light flux A.

The light intensity of the light flux C, which is the light intensity of light of +120 degrees direction in the light irradiation system of the comparison example is smaller than the light intensity of light of +120 degrees direction of the light irradiation system of the first example embodiment shown in FIG. 4.

The safety standard index value of the light irradiation system is computed using a light detector disposed at a position corresponding to a given distance (e.g., 200 mm) from the exit surface, in which the light detector is rotated about the exit surface, and the highest measured light intensity value is used to compute the safety standard index value.

In the light irradiation system of the first example embodiment, the light detector is disposed at the direction corresponding to a maximum peak value of the light flux A, which is light flux having strongest light intensity of the light emitting from the light source 602. Specifically, the light detector is disposed at a position distanced from the exit surface 514 for 200 mm to measure light intensity value. In the light irradiation system of the first example embodiment, the light intensity value at a position distanced from the exit surface 514 for 200 mm should be the safety standard index value or less.

Further, a size of the light detector that monitors the light intensity value is effectively smaller than a distance between the exit surface of the light irradiation system to the light detector disposed position.

In the light irradiation system of the first example embodiment, the counter reflector 613 is disposed at the irradiation direction of the light flux A, which is the direction that the light intensity of light emitting from the light source 602 becomes the strongest, in which the light emitted from the light irradiation system with the highest light intensity is reflected by the counter reflector 613 and measured.

In the light irradiation system of the first example embodiment, a reference face, where light exits, used for determining a position of the light detector is not the exit surface 514 of the light guide member 501 but is a face of the counter reflector 613.

As shown in FIG. 2, in the light irradiation system of the first example embodiment, the optical axis 605 of the optical scan system is set between the exit surface 514 and the counter reflector 613 to scan light reflected from the document face 601. Therefore, the light guide member 501 and the counter reflector 613 cannot be contacted with each other, but the light guide member 501 and the counter reflector 613 are disposed by setting a given space between the light guide member 501 and the counter reflector 613.

As to the light irradiation system of the first example embodiment, the counter reflector 613 is disposed at a position on an exiting direction of the light flux A. Therefore, compared to the light irradiation system of the comparison example, a distance between the exit surface 514 and the document face 601 becomes longer for a distance between the exit surface 514 and the counter reflector 613.

In the light irradiation system of the first example embodiment, because the distance between the exit surface 514 and the document face 601 becomes longer, attenuation of light becomes greater when the light reaches the light detector, with which light intensity value measured as the safety standard index value can be decreased.

Further, in the light irradiation system of the first example embodiment, because light intensity value of reflection light reflected by the counter reflector 613 is measured as the safety standard index value, the light intensity value can be attenuated based on the spectral reflectance of the counter reflector 603.

Figure 7:
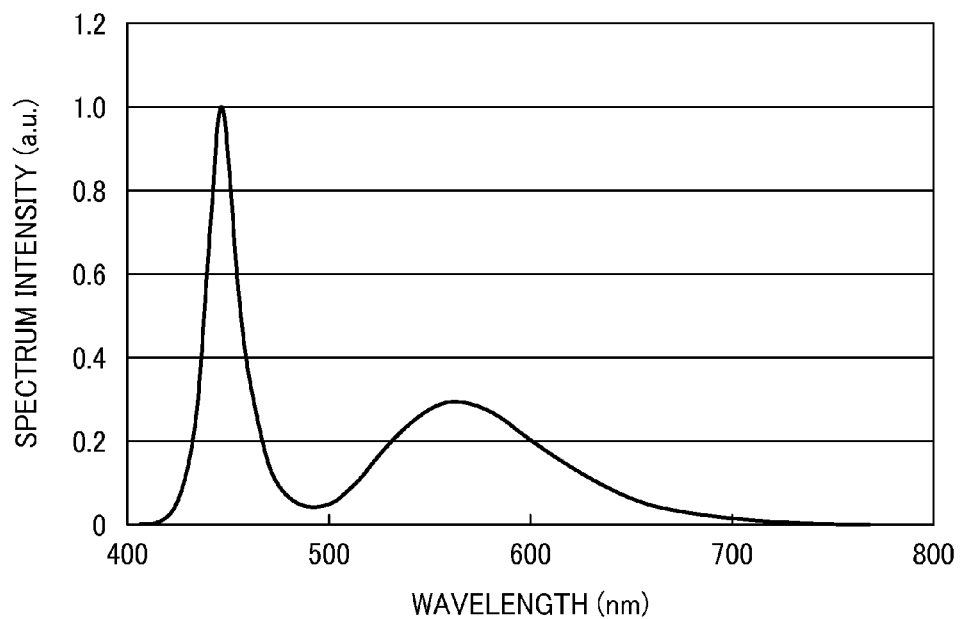
FIG. 7 is an example spectrum distribution of artificial white LED with respect to wavelength.

FIG. 7 is an example spectrum distribution of artificial white LED with respect to wavelength. In the light irradiation system of the first example embodiment, as indicated in FIG. 7, the artificial white LED used as the light source 602 includes blue light component greater than other light component, wherein the blue light component has a wavelength range from 380 nm (nanometer) to 480 nm.

Figure 8:
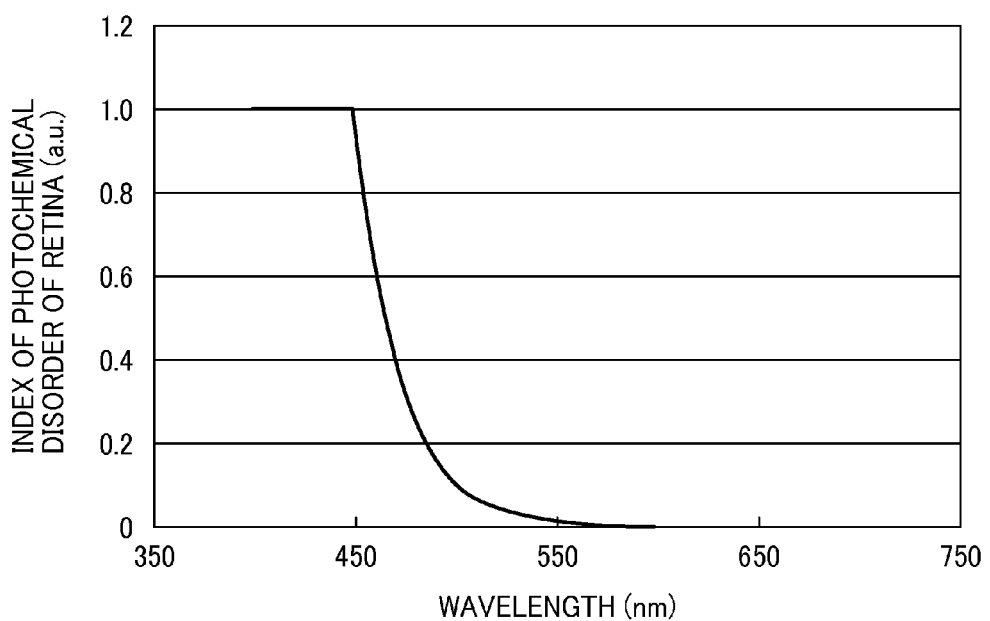
FIG. 8 is a graph showing an effect to human retina by exposing light having given wavelength defined by standards such as JIS C6802, IEC60825.

FIG. 8 is a graph showing an effect to human retina when exposed to light having a given wavelength defined by standards such as Japan Industrial Standard (JIS) C6802, International Electrotechnical Commission (IEC) 60825. Further, FIG. 9 is a graph showing an effect to human retina when exposed to light having given wavelength defined by standards such as JIS C7550, IEC/EN62471.

Figure 9:
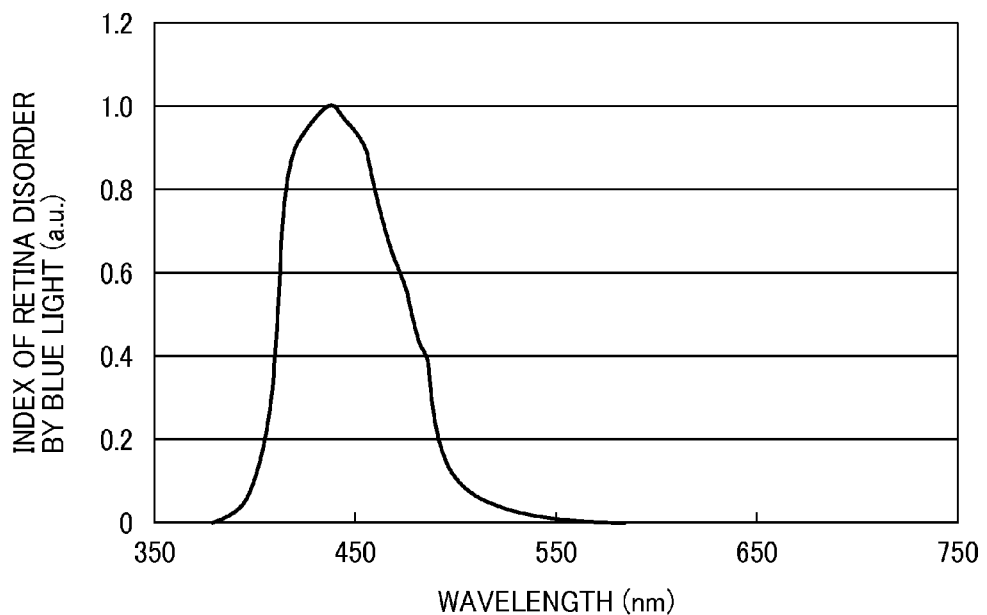
FIG. 9 is a graph showing an effect to human retina by exposing light having given wavelength defined by standards such as JIS C7550, IEC/EN62471.

FIG. 8 and FIG. 9 indicate that light having a wavelength close to the blue light component affect human retina greatly. Therefore, as to the light irradiation system of the first example embodiment, if the blue light component can be decreased, affection to human retina can be decreased.

A simulation is computed for the light irradiation system of the first example embodiment (FIG. 2) and the light irradiation system of the comparison example (FIG. 5) to determine the safety standard index value for blue light causing retina disorder (JIS C 7550, IEC/EN62471).

The simulation result indicates that the safety standard index value of the light irradiation system of the comparison example is 85 while the safety standard index value of the light irradiation system of the first example embodiment is 77. Therefore, the light irradiation system of the first example embodiment can decrease the safety standard index value about 10%.

Because the light irradiation system of the first example embodiment can decrease the safety standard index value, the number of LEDs used for the light source 602 can be increased, or an current input to LED can be increased, with which the light irradiation system of the first example embodiment can provide a brighter lighting optical system.

As to the above described light irradiation system of the first example embodiment, light can be irradiated to the document face 601 with enhanced irradiation efficiency while decreasing emission light intensity to a direction of the document face 601

Second Example Embodiment of Light Irradiation System

A description is given of a light irradiation system according to a second example embodiment, in which difference of the second example embodiment compared to the first example embodiment is described.

In the above described light irradiation system of the first example embodiment, the safety standard index value is computed by conducting the simulation of the safety standard index value by assuming spectral reflectance of the counter reflector 613 as a constant value.

In the light irradiation system according to the second example embodiment, the counter reflector 613 is applied with a multi-layer coating to decrease spectral reflectance for the light having a wavelength range from 380 nm to 480 nm.

In the second example embodiment, the counter reflector 613 is applied with the multi-layer coating that can decrease spectral reflectance for the light having a wavelength range from 380 nm to 480 nm about 10% compared to spectral reflectance for other light having a wavelength range from 481 nm to 780 nm.

As for the light irradiation system of the second example embodiment having the counter reflector 613 applied with the multi-layer coating, a simulation is computed to determine the safety standard index value for blue light causing retina disorder (JIS C 7550, IEC/EN62471.

The simulation result indicates that the safety standard index value of the light irradiation system of the second example embodiment is 72. Therefore, the light irradiation system of the second example embodiment can decrease the safety standard index value about 15% compared to the light irradiation system of the comparison example.

Therefore, as to the light irradiation system of the second example embodiment, the safety standard index value of "photochemical disorder of retina (JIS C 6802, IEC60825) and retina disorder by blue light (JIS C 7550, IEC/EN62471) can be decreased.

(Image Scanning Apparatus)

A description is given of an example of an image scanning apparatus according to an example embodiment, in which the image scanning apparatus according to the above described example embodiments is applied as an image scanner.

Figure 10:
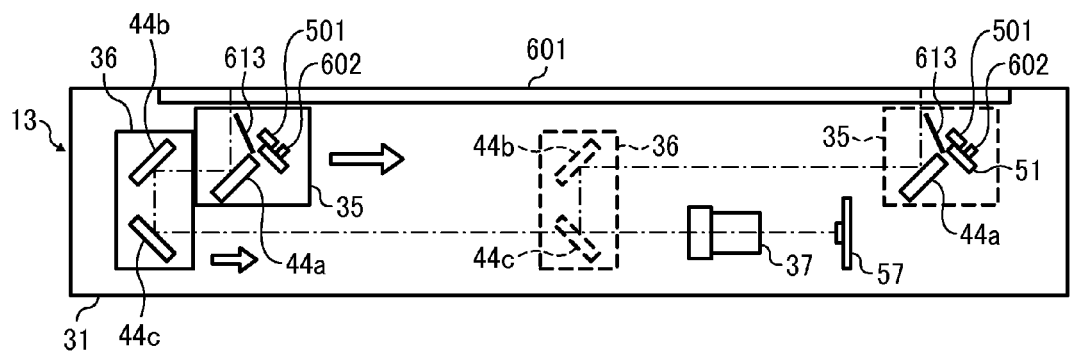
FIG. 10 is a cross-sectional view of an image scanning apparatus in a sub-scanning direction according to an example embodiment.

FIG. 10 is a schematic cross-sectional view of an image scanning apparatus 13 according to an example embodiment, which is cut in the sub-scanning direction. FIG. 10 shows positional relationship between parts of the image scanning apparatus 13.

Figure 11:
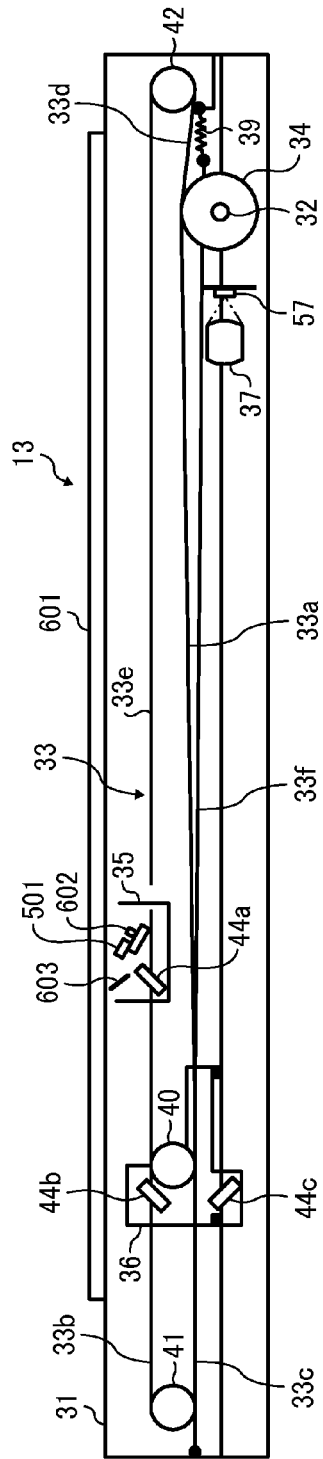
FIG. 11 is a schematic view of a drive wire and a pulley for the image scanning apparatus.
Figure 12:
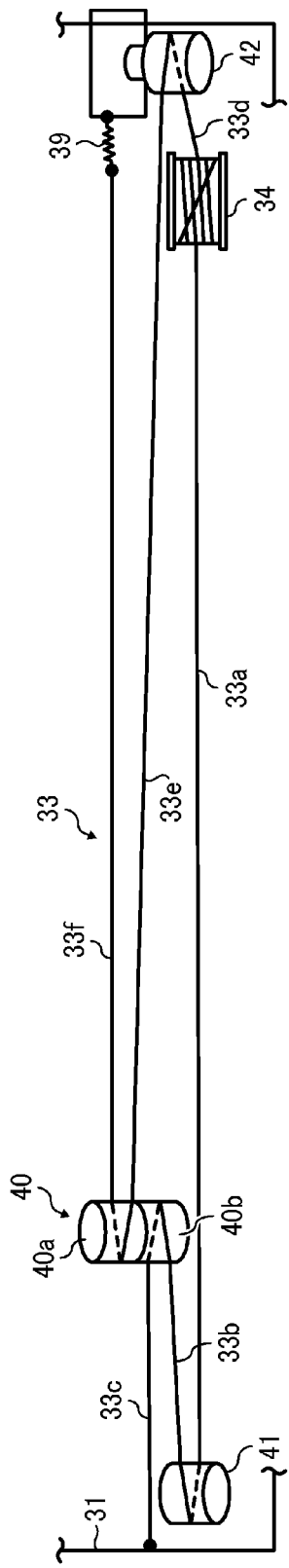
FIG. 12 is a schematic view of a linking condition of the drive wire of FIG. 11.

FIG. 11 is a schematic view of a drive wire and a pulley in the image scanning apparatus 13. Further, FIG. 12 is a schematic view of a linking condition of the drive wire.

In the image scanning apparatus 13, a first carriage 35 and a second carriage 36 can be driven in the left and right directions (sub-scanning direction) in FIG. 10. In the image scanning apparatus 13, light from the light source 602 is irradiated to the document face 601 from the light guide member 501 and the counter reflector 613 as scanning light to scan image information of document placed on the document face 601.

The reflection light reflected by the document face 601 is captured by an image capturing element 57 such as a charge coupled device (CCD) used as a light receiving member via a light condensing member such as a lens unit 37 used for condensing the reflection light.

As shown in FIG. 11, the image scanning apparatus 13 includes, for example, a main frame 31, a drive axis 32, a drive wire 33, a wire-driven pulley 34, a first carriage 35, and a second carriage 36. Further, the image scanning apparatus 13 includes, for example, the lens unit 37, an extension spring 39, a carriage pulley 40, idler pulleys 41 and 42, and an image capturing element 57.

Further, a first rail and a second rail are disposed in the main frame 31. The first carriage 35, which is a movable unit, is slideably attached on the first rail. Further, the second carriage 36 is slideably attached on the second rail.

The drive axis 32 is linked to a motor. Further, both ends of the drive axis 32 are attached with the wire-driven pulley 34, and the drive wire 33 is wound up along the wire-driven pulley 34.

The drive wire 33 is extended in the left and right directions of FIG. 11 and FIG. 12. The drive wire 33 may use two wires such as one wire for driving the first carriage 35 and one wire for driving the second carriage 36. FIG. 11 and FIG. 12 shows the drive wire 33 used for driving the second carriage 36.

Further, two sets of the drive wire 33 and the idler pulleys 41 and 42 are disposed in the main frame 31, in which one set is disposed at the front side and one set is disposed at the rear side. Because the two set of the drive wire 33 and the idler pulleys 41 and 42 have the same configuration and function, only one set of the drive wire 33 and one of the idler pulleys 41 and 42 is explained.

In the image scanning apparatus 13, two drive wires 33 and four idler pulleys 41 and 42 are disposed at the four corners of the main frame 31.

The second carriage 36 includes the carriage pulley 40. The drive wire 33 is wound up to the carriage pulley 40 and the idler pulleys 41 and 42.

The first carriage 35 includes the light irradiation system according to the above described example embodiments, with which the image scanning apparatus 13 irradiates the document face 601 using two lights coming from the two directions, in which one light (direct light) irradiates the document face 601 directly from the light guide member 501 and another one light (indirect light) from the counter reflector 613 irradiates the document face 601.

Therefore, as to the image scanning apparatus 13, the document face 601 can be irradiated with enhanced irradiation efficiency while decreasing emission light intensity to a direction of the document face 601.

(Image Forming Apparatus)

A description is given of an example of an image forming apparatus according to an example embodiment.

Figure 13:
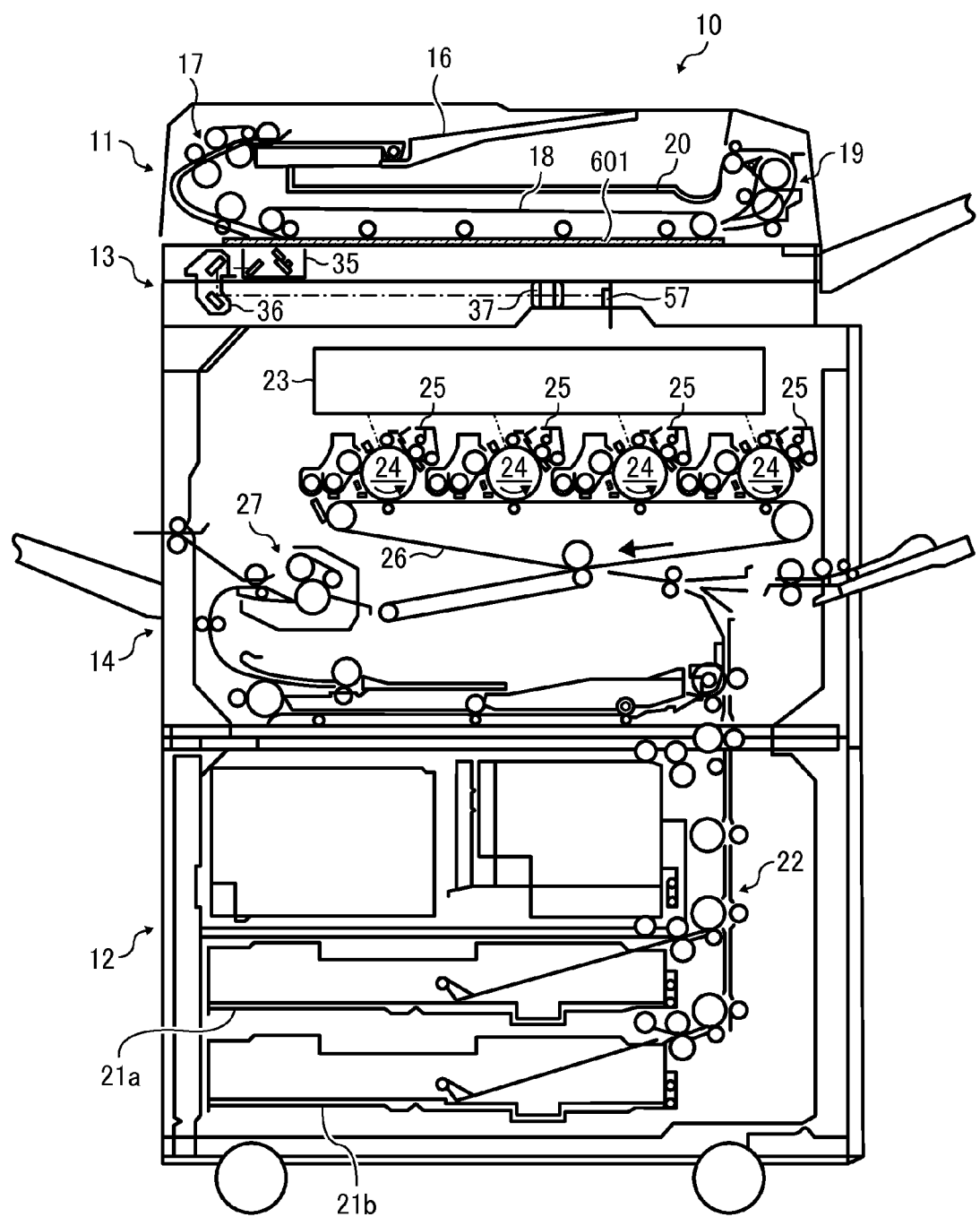
FIG. 13 is a cross-sectional view of an image forming apparatus according to an example embodiment.

FIG. 13 is a schematic cross-sectional view of an image forming apparatus according to an example embodiment, in which the image forming apparatus is, for example a color copier (hereinafter, copier).

Further, the image forming apparatus according to an example embodiment may be a facsimile machine having an image scanner, and multi-functional peripherals (MFPs) having a copy function and a facsimile function.

As shown in FIG. 13, an image forming apparatus 10 includes, for example, an automatic document feeder 11, a sheet feed unit 12, the image scanning apparatus 13, and an image forming unit 14.

The automatic document feeder 11 transports document sheets placed on a document tray 16 to a contact glass, which is a transparent member, using a sheet separation and feed unit 17 having various rollers such as a feed roller and a separation roller.

A transport belt 18 transports scanned document from the contact glass. A sheet ejection unit 19 having various ejection rollers ejects document sheets transported from the transport belt 18 to a sheet ejection tray 20.

Further, when both face of the document is scanned, a branching unit included in the sheet ejection unit 19 and the transport belt 18 are used to return the document to the contact glass to scan not-yet-scanned face.

The sheet feed unit 12 includes, for example, sheet cassettes 21a and 21b and a sheet feeder 22. The sheet cassettes 21a and 21b store recording sheets having different sizes used as recording medium. The sheet feeder 22 having various rollers transports the recording sheets stored in the sheet cassettes 21a and 21b to a transfer position.

The image scanning apparatus 13 includes a configuration of the image scanning apparatus according to the above described example embodiment. In the image scanning apparatus 13, the first carriage 35 having the light irradiation system, and the second carriage 36 can be driven in the left and right directions (sub-scanning direction) in FIG. 13, and light emitted from a light source irradiated on the document face 601 as scanning light using a light guide member and a counter reflector.

The scanning light reflected on the document face 601 is captured by the image capturing element 57 such as a CCD via the mirror and the lens unit 37.

The image forming unit 14 includes, for example, an exposure device 23, a photoconductor drums 24, a development device 25, a transfer belt 26, and a fusing device 27.

The exposure device 23 generates writing signals based on scanned signals taken by the lens unit 37. The writing signals generated by the exposure device 23 can be formed on a plurality of photoconductor drums 24.

Each of the development devices 25 is filled with different color toners such as cyan, magenta, yellow, and black toners. Each of the development devices 25 supplies respective color toner to each of the photoconductor drums 24 to develop the writing signal as a toner image.

By transferring the toner images of different color toners from the photoconductor drums 24 to the transfer belt 26 as a superimposed image, a color image is formed on the transfer belt 26. The color image is then transferred to a recording sheet supplied from the sheet feed unit 12. The fusing device 27 fuses the color image on the recording sheet.

In the above described image forming apparatus according to an example embodiment, the document face 601 is irradiated by the two lights coming from the two directions. in which one light (direct light) irradiates the document face 601 directly from the light guide member and another one light (indirect light) coming from the counter reflector irradiates the document face 601.

Therefore, as to the image forming apparatus according to the above example embodiments, the document face 601 can be irradiated with enhanced irradiation efficiency while decreasing emission light intensity to a direction of the document face 601.

The light irradiation system according to the above described example embodiments can irradiate a document face direction with enhanced irradiation efficiency while decreasing emission light intensity to a direction of the document face.

Numerous additional modifications and variations are possible in light of the above teachings. It is therefore to be understood that, within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A light irradiation system for irradiating light to an irradiation area extending in a main scanning direction of a document face when placed on an image scanning apparatus, comprising:

a light source;

a light guiding member to guide light emitted from the light source; and a reflector to reflect a part of light, exiting from the light guiding member, to the document face as first light, wherein the irradiation area is irradiated by the first light reflected from the reflector and second light exiting from the light guiding member to the document face directly without reflection at the reflector, wherein the light guiding member includes:

an incidence surface where the light from the light source enters;

an exit surface where the light entered from the incidence surface exits to either the document face directly or the reflector;

a first side face extending from the incidence surface;

a second side face opposite the first side face and extending from the incidence surface, wherein a distance between the first and second side faces increases in a direction extending away from the incidence surface;

a third side face extending from the first side face on a continuous plane to the exit surface; and a total reflectance face opposite the third side face and extending from the second side face on a continuous plane to the exit surface, wherein a distance between the total reflectance face and the third side face increases in a direction extending away from the first and second side faces, wherein the reflector is disposed at a position in a direction that light intensity of light emitting from the light guiding member becomes the strongest; and wherein light exiting from the light guiding member and then directed to a reflection face of the reflector, and light exiting from the light guiding member and directly irradiating a document without reflection by the reflector exit from the exit surface.

2. The light irradiation system of claim 1, wherein light going from the light guiding member to the reflector exits only from the exit surface of the light guiding member.

3. The light irradiation system of claim 1, wherein light going from the light guiding member to the irradiation area without reflection at the reflector exits only from the exit surface of the light guiding member.

4. The light irradiation system of claim 1, wherein the light guiding member includes a total reflection face to totally reflect a part of light entering from the incidence surface to the irradiation area as the second light, wherein the light totally reflected at the total reflection face exits from the exit surface as the second light toward the irradiation area, and light going to the reflector exits from the exit surface without reflection at the total reflection face.

5. The light irradiation system of claim 4, wherein the reflector is disposed in the direction that the light intensity of light emitted from the light guiding member becomes the strongest, and the exit surface of the light guiding member is not viewable from a backside of the reflector.

6. The light irradiation system of claim 1, wherein spectral reflectance of the reflector for light emitted from the light source having a wavelength range of from 380 nm to 480 nm is smaller than spectral reflectance of the reflector for light emitted from the light source having a wavelength range of from 481 nm to 780 nm.

7. The light irradiation system of claim 1, wherein reflectance of the reflector is smaller than one.

8. The light irradiation system of claim 7, wherein the light guiding member and the reflector are disposed apart with a given distance.

9. An image scanning apparatus for scanning image information on a face of a document, comprising:
   the light irradiation system of claim 1 that irradiates the face of the document;
   a light condensing member to condense the reflection light reflected from the face of the document; and
   a light receiving member to receive light condensed by the light condensing member.

10. An image forming apparatus, comprising:
   the image scanning apparatus of claim 9 to scan image information on the face of the document, wherein an image of the document is formed on a recording medium based on the image information scanned with the image scanning apparatus.

* * * * *